LOCK-OUT, NO RINGBACK

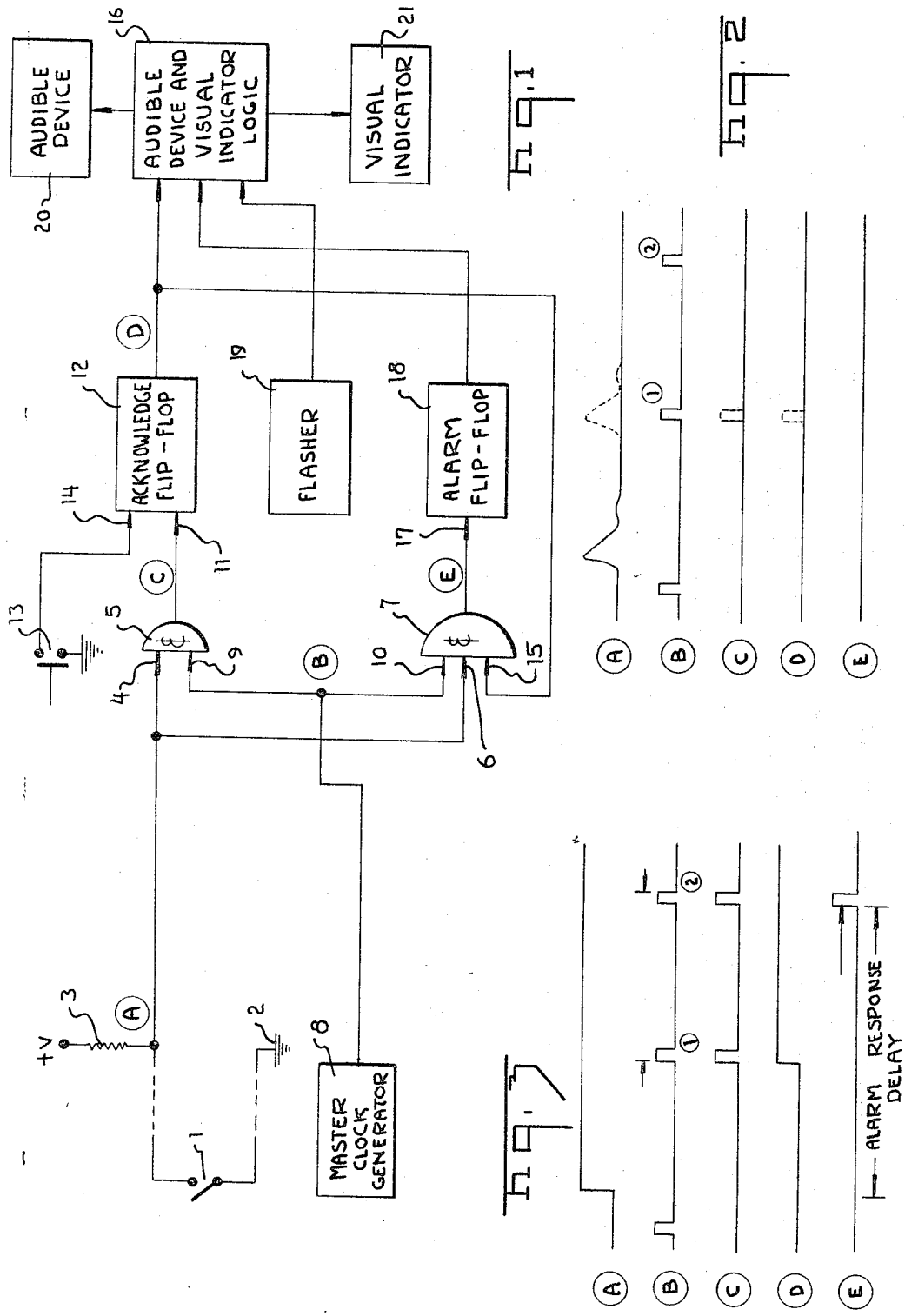

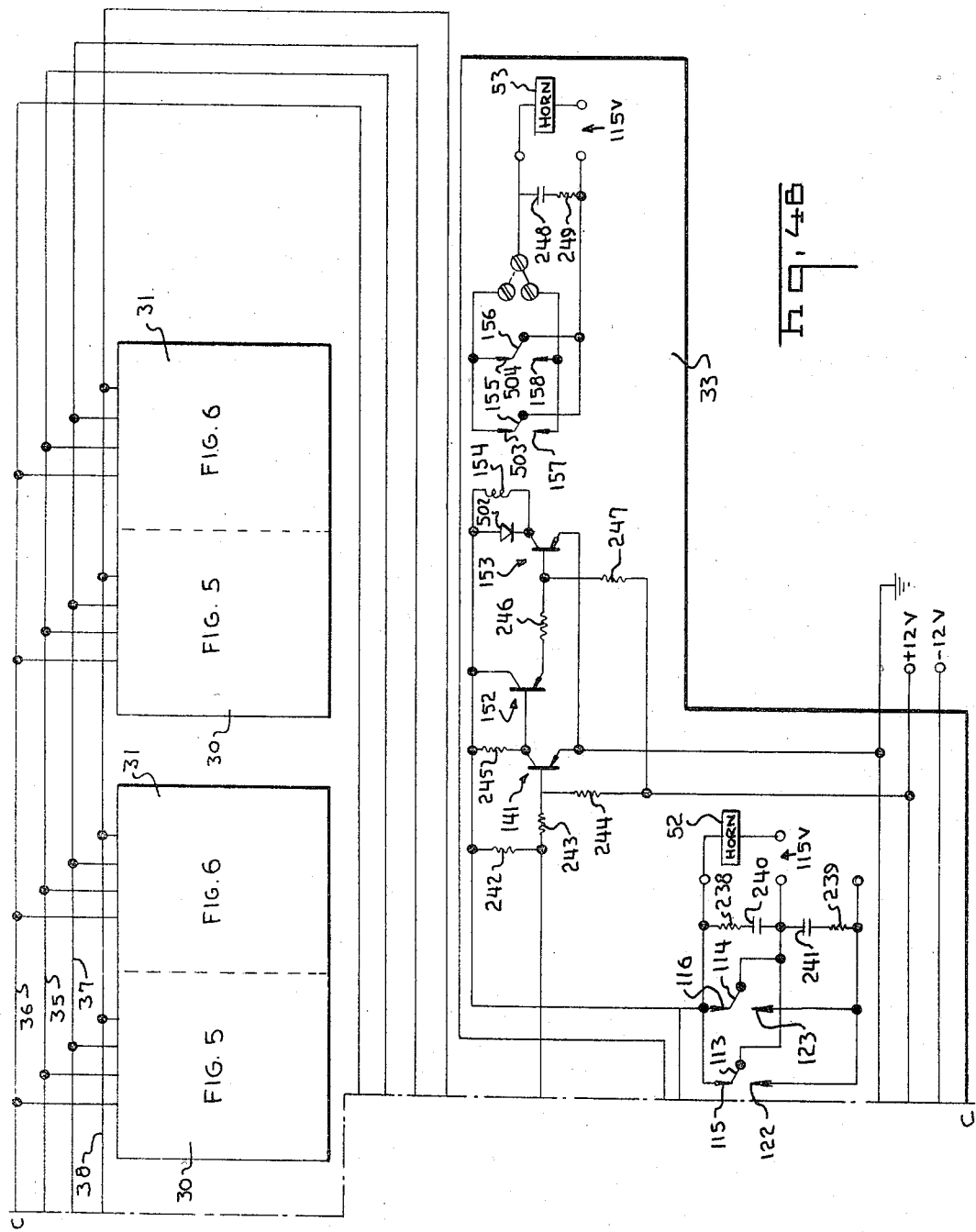

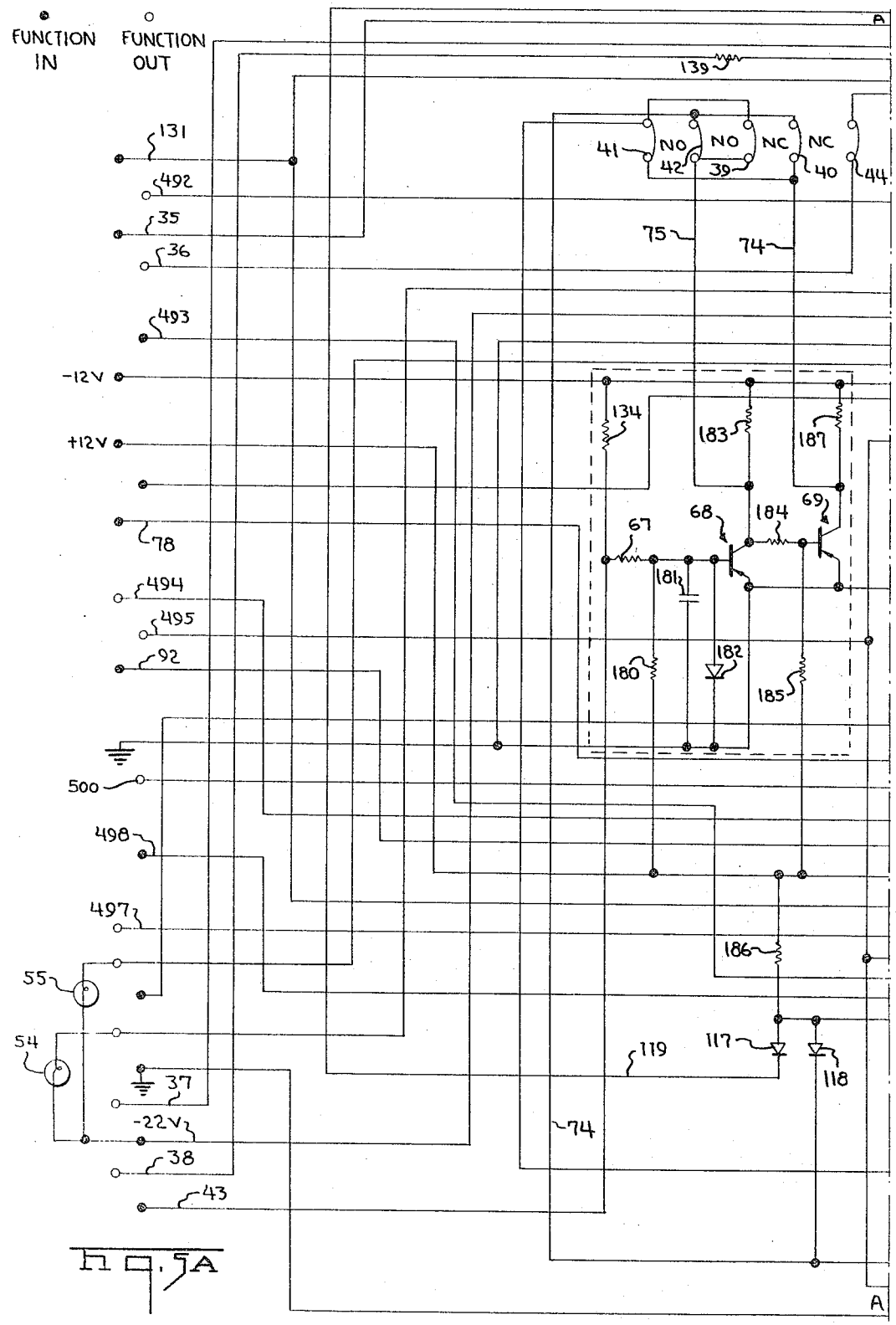

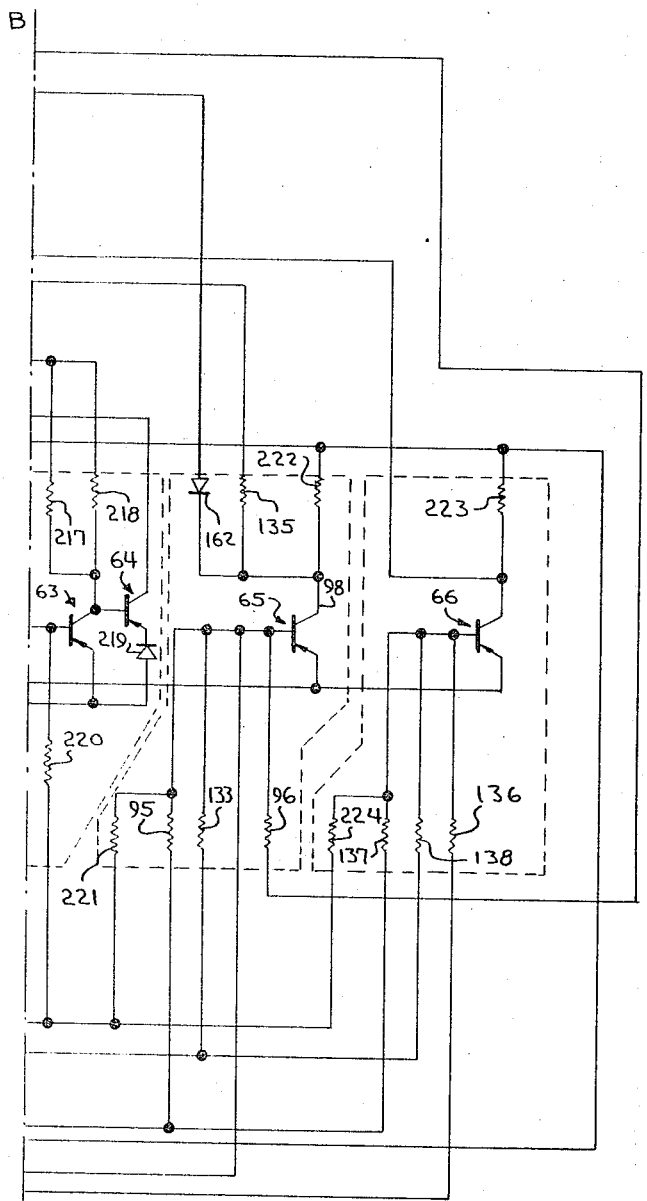

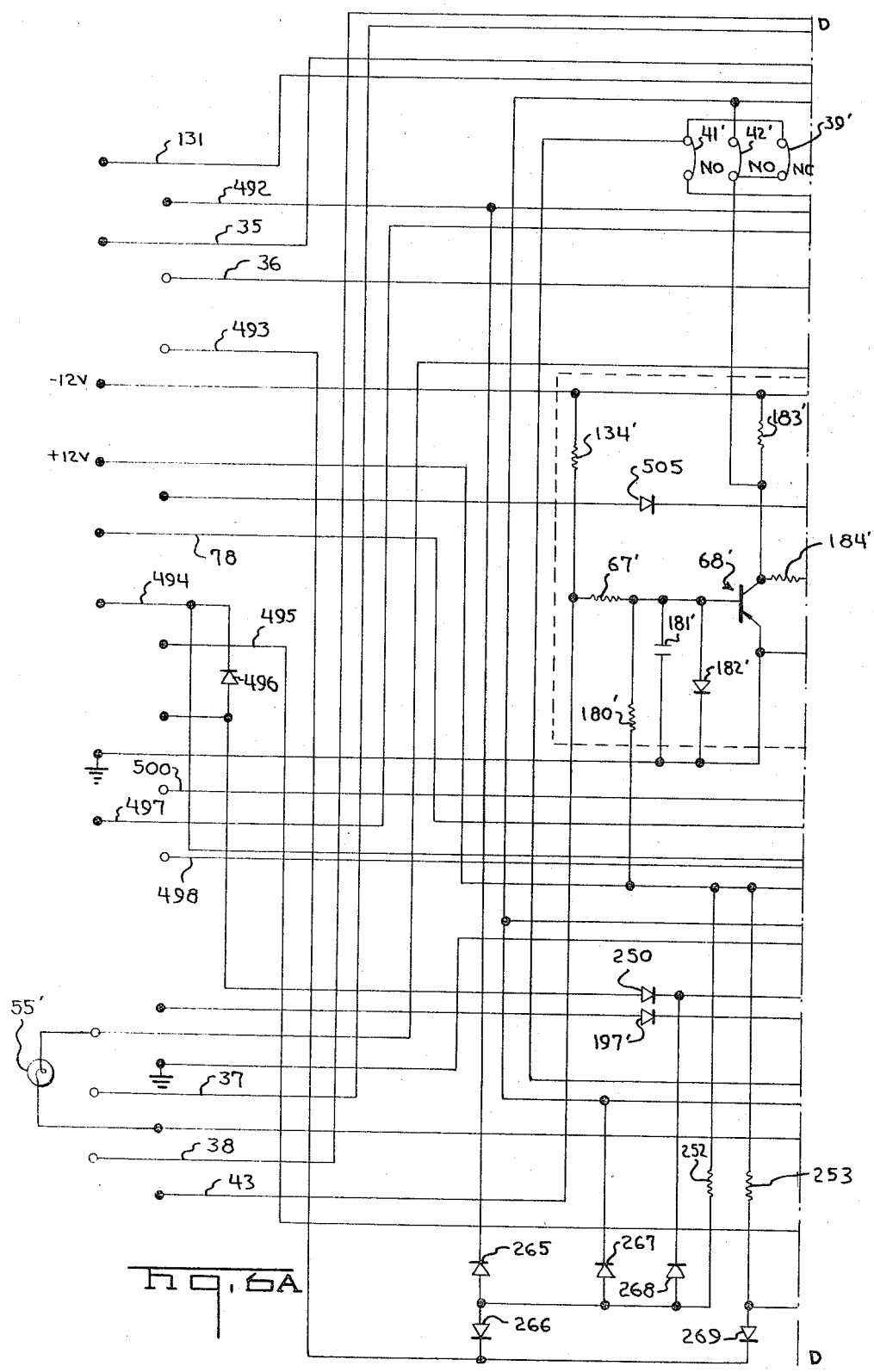

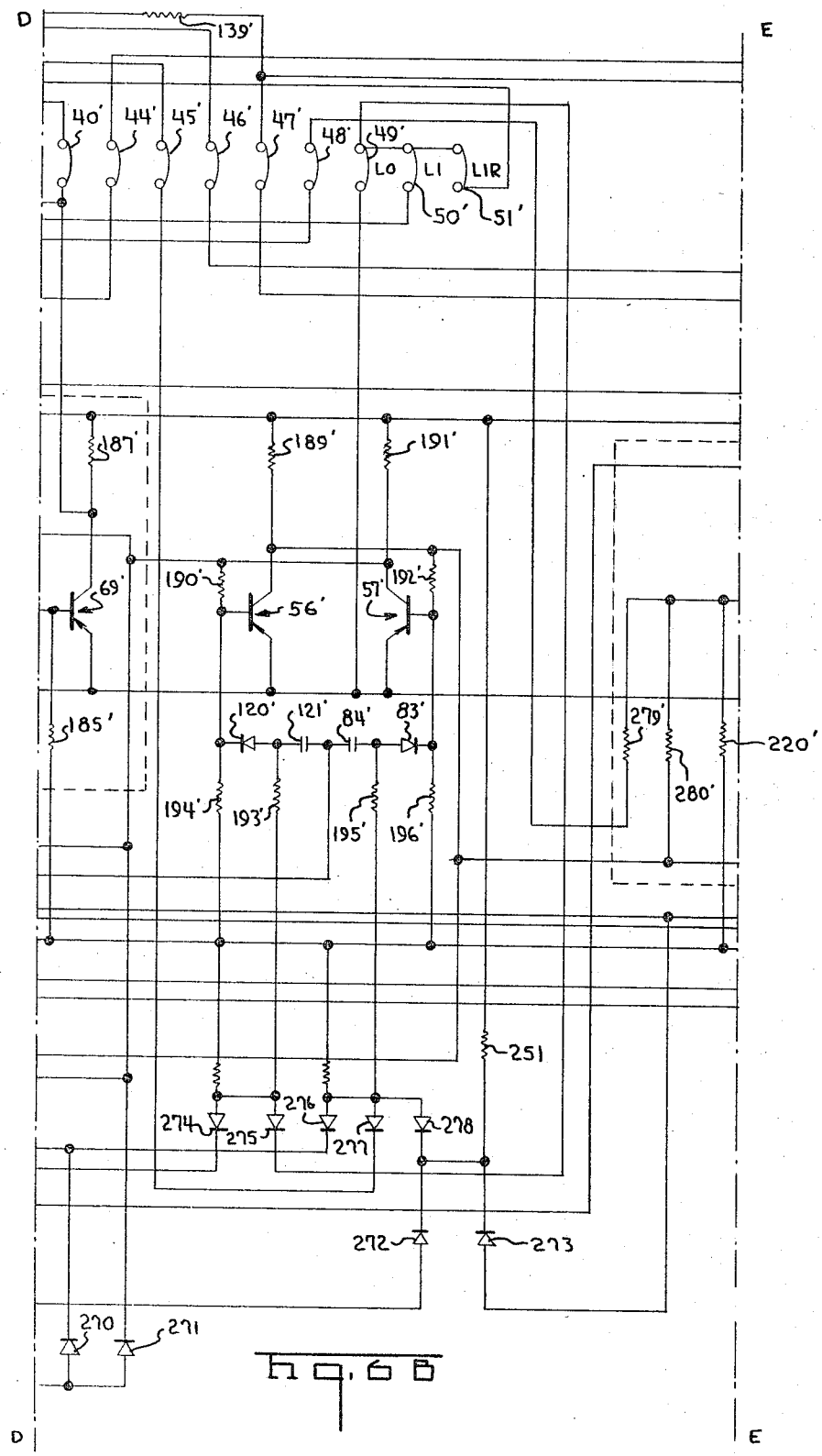

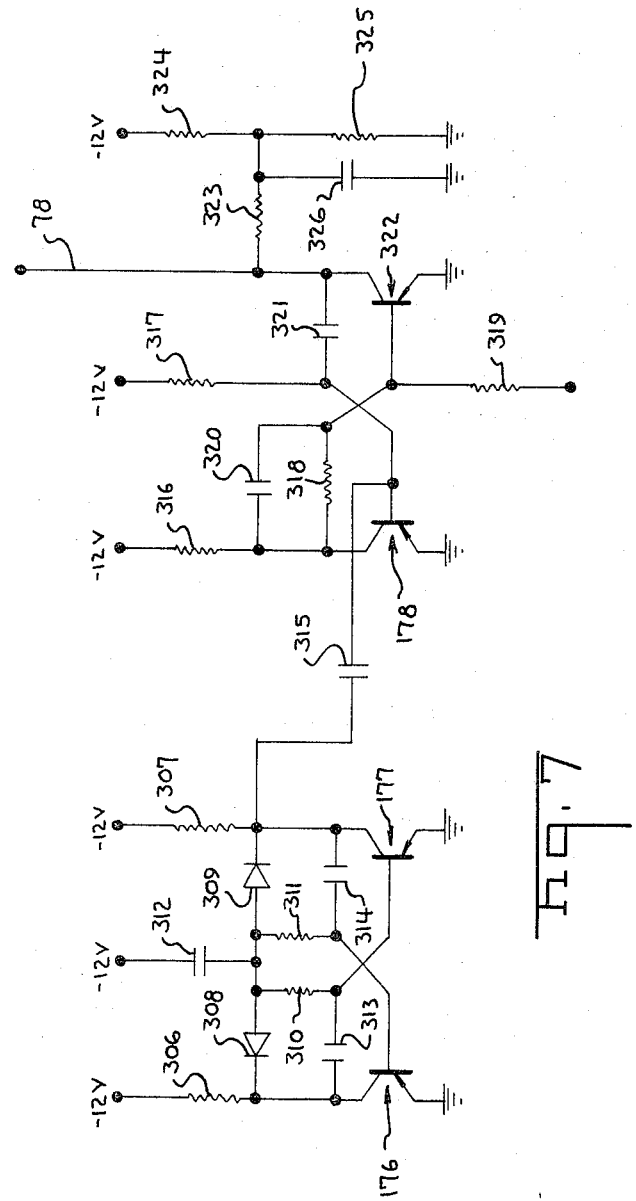

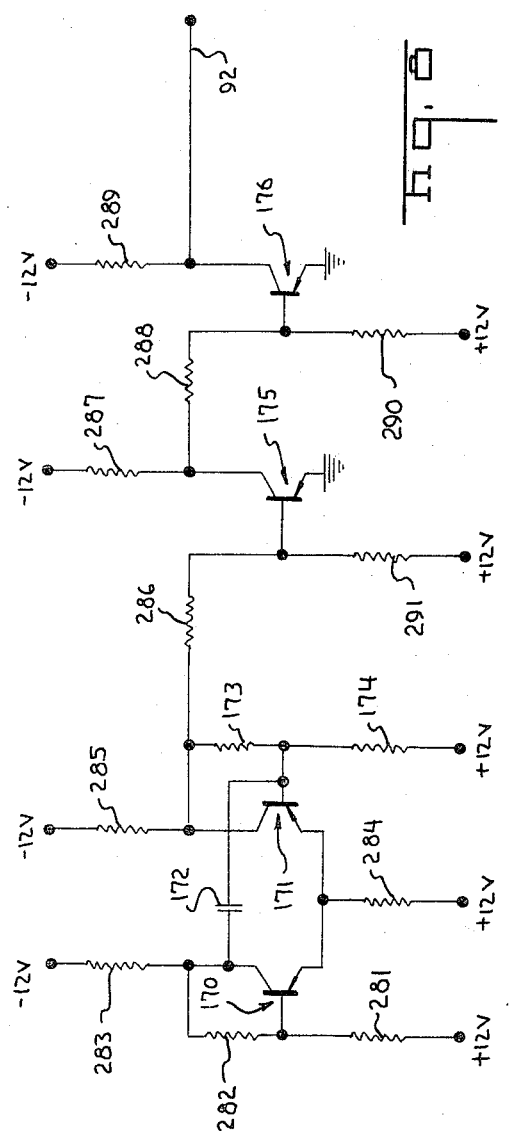

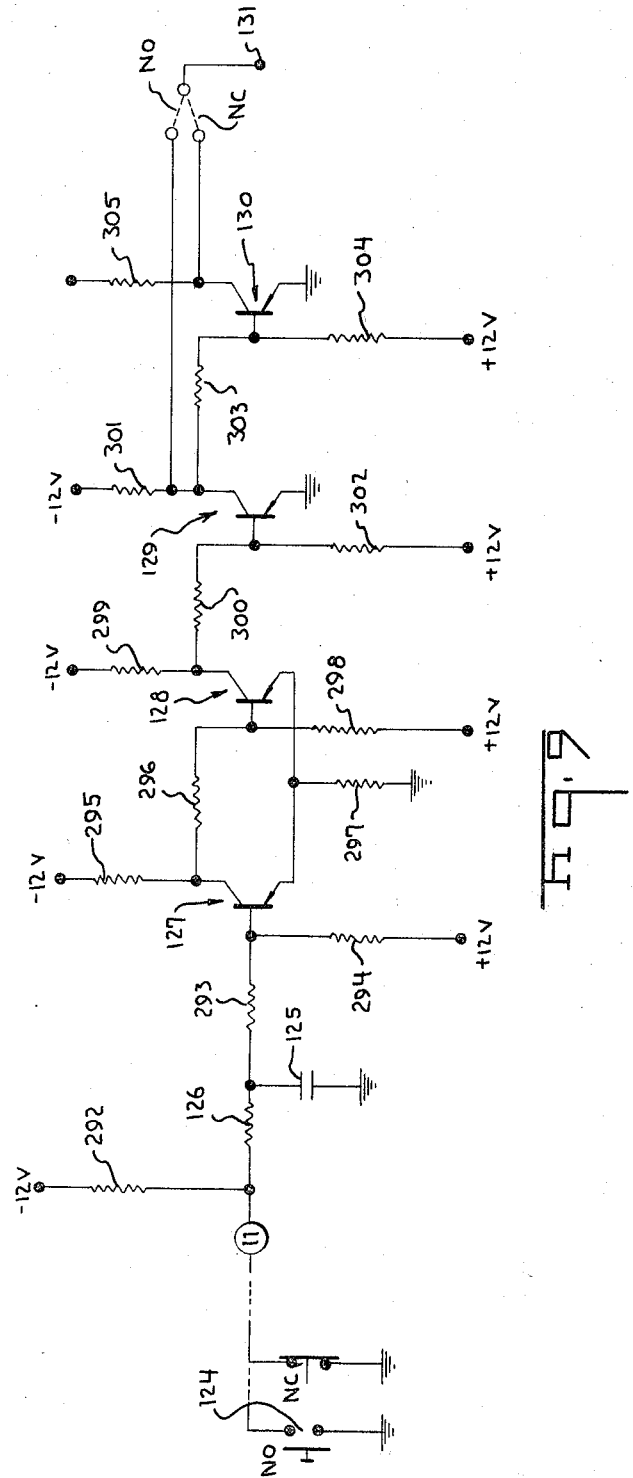

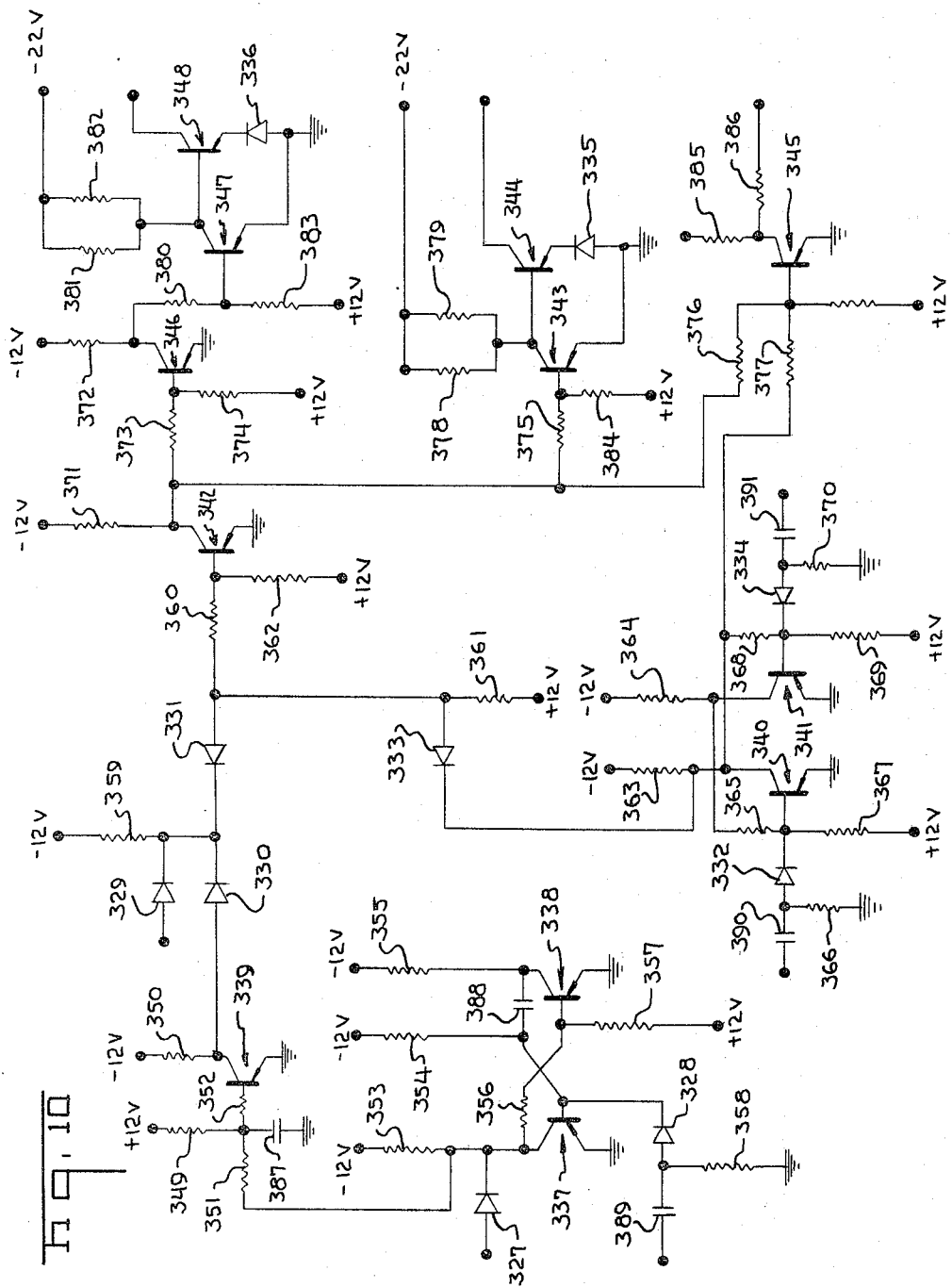

| INPUT | ALARM MEMORY FF | ACKNOWLEDGE FF | NORMAL LT | FLASHER | ALARM LT | NORMAL HORN | RINGBACK HORN |
|---|---|---|---|---|---|---|---|
| NORMAL | OFF-57 ON | ON OR OFF | ON-61 ON | OFF-62 OFF | OFF-64 OFF | OFF-65 ON | OFF |
| ABNORMAL | ON-56 ON | OFF-59 ON | OFF-61 OFF | ON-62 ON | ON-64 ON | ON-65 ON | OFF |
| NORMAL BEFORE ACK | OFF-57 ON | OFF-59 ON | ON-61 ON | OFF-62 OFF | OFF-64 OFF | OFF-65 ON | OFF |
| ABNORMAL WITH ACK | ON-56 ON | ON-58 ON | OFF-61 OFF | ON-PERM | ON-64 ON | OFF-65 ON | OFF |
| NORMAL AFTER ACK | OFF-57 ON | ON-58 ON | ON-61 ON | OFF-62 OFF | OFF-64 OFF | OFF-65 ON | OFF |

LOCK-IN, NO RINGBACK

| INPUT | ALARM MEMORY FF | ACKNOWLEDGE FF | NORMAL LT | FLASHER | ALARM LT | NORMAL HORN | RINGBACK HORN |
|---|---|---|---|---|---|---|---|
| NORMAL | OFF-57 ON | ON OR OFF | ON-61 ON | OFF-62 OFF | OFF-64 OFF | OFF-65 ON | OFF |
| ABNORMAL | ON-56 ON | OFF-59 ON | OFF-61 OFF | ON-62 ON | ON-64 ON | ON-65 ON | OFF |
| NORMAL BEFORE ACK | ON-56 ON | OFF-59 ON | OFF-61 OFF | ON-62 ON | ON-64 ON | ON-65 ON | OFF |
| ABNORMAL WITH ACK | ON-56 ON | ON-58 ON | OFF-61 OFF | ON-PERM | ON-64 ON | OFF-65 ON | OFF |
| NORMAL BEFORE ACK WITH ACK | OFF-57 ON | ON-58 ON | ON-61 ON | OFF-62 OFF | OFF-64 OFF | OFF-65 ON | OFF |
| NORMAL AFTER ACK | OFF-57 ON | ON-58 ON | ON-61 ON | OFF-62 OFF | OFF-64 OFF | OFF-65 ON | OFF |

LOCK-IN, RINGBACK

| INPUT | ALARM MEMORY FF | ACKNOWLEDGE FF | NORMAL LT | FLASHER | ALARM LT | NORMAL HORN | RINGBACK HORN |
|---|---|---|---|---|---|---|---|
| NORMAL | OFF-57 ON | OFF-59 ON | ON-61 ON | OFF-62 OFF | OFF-64 OFF | OFF-65 ON | OFF-66 ON |
| ABNORMAL | ON-56 ON | OFF-59 ON | OFF-61 OFF | ON-62 ON | ON-64 ON | ON-65 ON | OFF-66 ON |
| NORMAL BEFORE ACK | ON-56 ON | OFF-59 ON | OFF-61 OFF | ON-62 ON | ON-64 ON | ON-65 ON | ON-66 OFF |
| ABNORMAL WITH ACK | ON-56 ON | ON-58 ON | OFF-61 OFF | ON-PERM | ON-64 ON | OFF-65 ON | OFF-66 ON |
| NORMAL BEFORE ACK WITH ACK | OFF-57 ON | ON-58 ON | ON-61 ON | OFF-62 OFF | OFF-64 OFF | OFF-65 ON | OFF-66 ON |
| NORMAL AFTER ACK, ACK OF RINGBACK | OFF-57 ON | ON OFF-59 ON | ON-61 ON | OFF-62 OFF | OFF-64 OFF | OFF-65 ON | OFF-66 ON |

Fig. 11

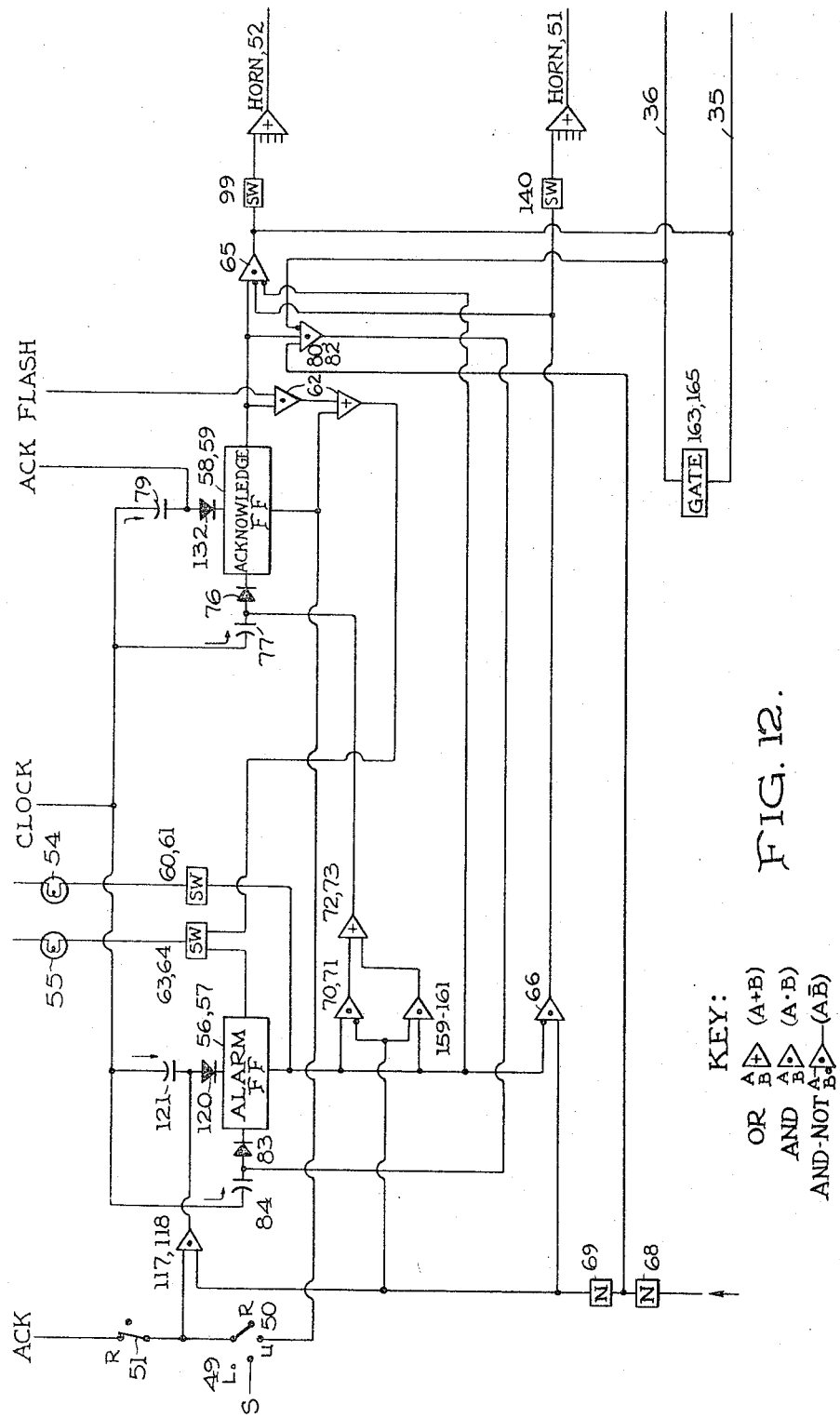

United States Patent Office 3,307,166
Patented Feb. 28, 1967

3,307,166
ANNUNCIATOR SYSTEM
Charles B. Slack, 1500 Allen Ave., Glendale, Calif. 91201, and Nels E. Swanson, 1133 E. Redondo Blvd., Inglewood, Calif. 90302
Filed Sept. 8, 1964, Ser. No. 394,714
6 Claims. (Cl. 340—213)

This invention relates broadly to annunciator systems and more specifically to annunciator systems having high reliability of operation inherent therein to the elimination of the response of the annunciator system to transient signals applied thereto. This invention also relates more specifically to an annunciator system wherein each points of a multiplicity of alarm points can be set up independently of all other alarm points with regard to sequence or mode of operation.

With the advent of highly automated industry wherein machinery has been taking over the functions previously handled by humans a serious problem has been recognized in such automated machinery. In the event of a breakdown in the operation of at least one of the machines of an automated process, often no operater is located near the equipment to immediately notify plant personnel where the breakdown has occurred so that the trouble can be immediately located and corrected. These breakdowns can occur from an actual fault in an equipment or from the operation, for example, of a safety shut down device. Sometimes, the malfunction of one piece of equipment may cause the automatic shut down of many other pieces of equipment in a production line and thereby make it difficult to determine where the original fault occurred.

In order to overcome the above difficulties, annunciator systems have been widely used in the art so that fault conditions occurring in an automated plant could be easily located and corrected, thereby saving costly production time and providing a more economical utilization of automated equipment. Annunciator systems of the prior art, however, have been subject to inherent problems found in plants and factories, which, for example, might cause such annunciator systems to register an alarm or fault condition, when, in fact, no such condition actually exists. These fault conditions are usually provided from transient response conditions caused by sudden fluctuations of plant line current and/or voltage due to the starting up of motor, other heavy electrical equipment, electric storms, 60 c.p.s. steady state currents in the line, changes in service from the power station station supplying the current, and the like. The prior art has recognized this problem caused by transient response in annunciator system and, in recent years, has attempted to correct such problem. The common approach whereby this problem might be alleviated in some measure has been to provide a capacitor across the input of a level detection device whereby a short transient signal would pass through the capacitor and fail to charge such capacitor to a sufficient high voltage to actuate the level detection switch. This would be caused by providing a resistor in series with the alarm sensing device and the capacitor whereby a high RC time constant is obtained. Such a circuit will work adequately when the transient is of short duration and wherein a plurality of transient signals does not pile up one upon the other. However, when the transient signal is of sufficiently great duration or when a sufficiently large number of transient signals repeat within a sufficiently short space of time, the capacitor will charge up to the required voltage level to trigger the voltage level detection switch and register a fault condition to the annunciator system. This problem has been very prevalent in the present annunciator systems and has often required the shutting down of a plant due to the sensing of a non-existent fault condition, thereby causing a great deal of economic waste due to the non-usage of the equipment until such time as it can be determined that no fault in fact exists.

In accordance with the present invention the problem of sensing a fault condition due to transient response is substantially eliminated by the use of "gated clock logic." In accordance with the present invention an alarm indication will only be recognized by the annunciator system if such alarm signal is present for a period of two consecutive clock pulses from a clock generator, the pulses from the clock generator being spaced in time by an amount greater than the length of transient response signals. In this manner, any transient signal could not possibly pass through the system and actuate the annunciator system unless such transient were most unusually long or if two transient signals occurred at identically the same time as two consecutive clock signals from the clock generator. These two latter conditions would be most unusual and therefore substantially all faulty operation due to the recognition of a transient signal as an alarm condition is eliminated by the present invention.

A further problem encountered in prior art annunciator systems is the lack of versatility of such devices. For example, prior art devices have been designed to operate with a particular type of alarm contact switch such as normally open or normally closed but not with either type or both types of switch in the same system. Prior art annunciator systems have been known which are capable of operating in either the lock-in or lock-out mode of operation and with or without ringback by the manipulation of switches therein. However, prior art annunciator systems have not been known wherein each alarm circuit connected to the central station can be individually adjusted to operate in any combination using (1) no lock-in and no ringback, (2) lock-in and no ringback, or (3) lock-in and ringback. These problems are overcome by the present invention wherein a particular switching arrangement is provided whereby each alarm circuit can be adjusted to operate in any one of the above three mentioned modes of operation and whereby either a normally open or normally closed alarm contact switch can be utilized without necessitating a complete re-design of the circuit to accommodate such changes.

It is therefore an object of this invention to provide an annunciator system capable of rejecting substantially all transient signals at the alarm input.

It is a further object of this invention to provide "gated clock logic for eliminating input transient signals in an annunciator system.

It is a still further object of this invention to provide a "gated clock logic" system in an annunciator whereby a fault condition is sensed only when such fault appears for two consecutive clock pulse time periods.

It is a still further object of this invention to provide an alarm condition sensing flip-flop which is normally biased in the off condition to prevent actuation thereof by a transient signal generated within the annunciator system itself.

It is a still further object of this invention to provide a switch system for an annunciator whereby each alarm circuit is capable of operating in a different mode or with a different sequence of operations.

It is a still further object of this invention to provide an annunciator system capable of operating with either normally open or normally closed alarm contact switches.

The above objects and still further objects of this invention will become apparent to those skilled in the art from a careful study of the following description of a specific preferred embodiment of the invention which is provided by way of example and not by way of limitation when taken in conjunction with the accompanying drawings wherein:

FIGURE 1 is a block diagram of a simplified annunciator system setting forth one feature of the present invention;

FIGURE 2 is a wave diagram showing the signals at various points in FIGURE 1 for a transient input;

FIGURE 3 is a wave diagram showing the signals at various points in FIGURE 1 for a fault input indication;

Figure 4A:
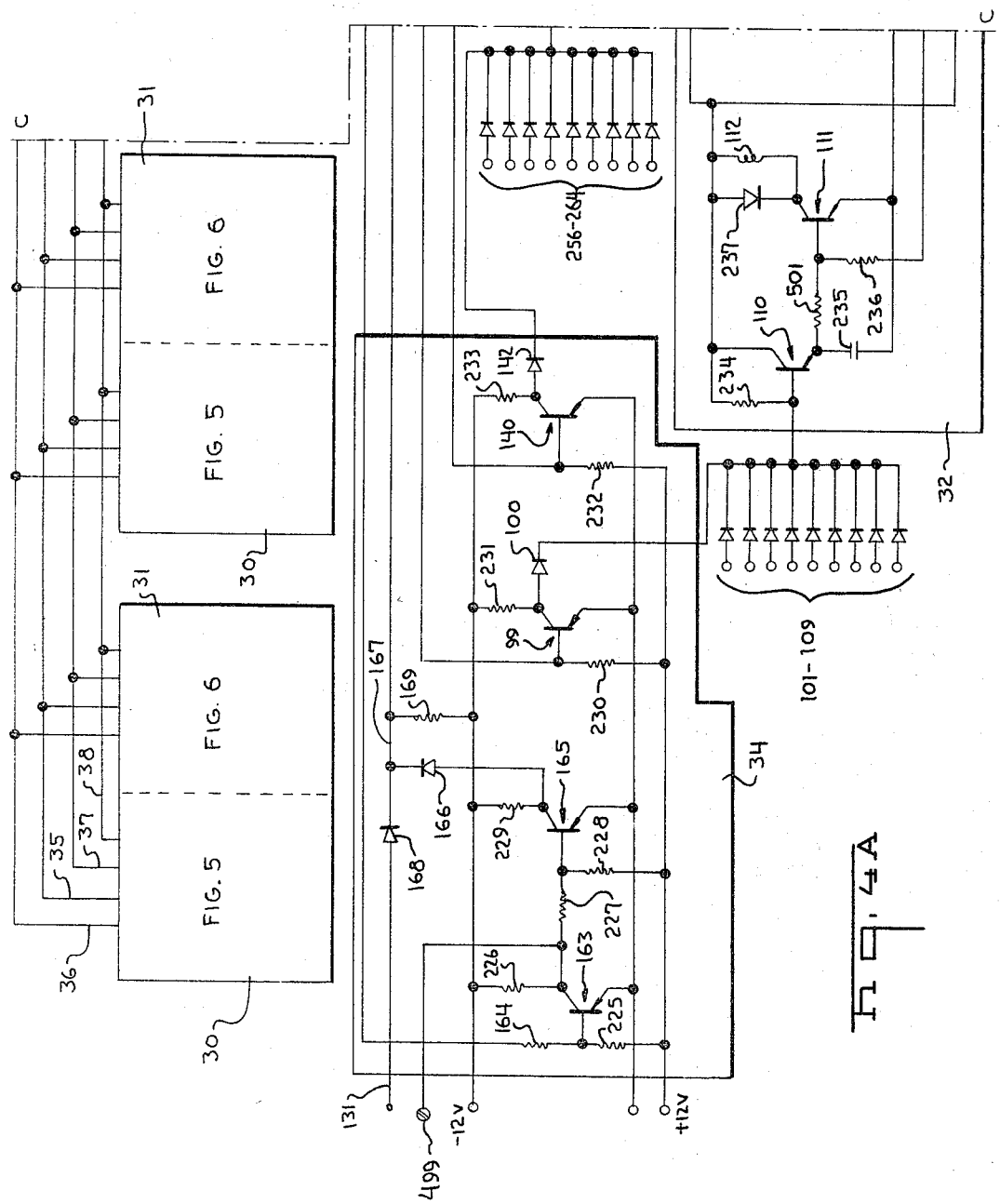
Figure 5B:
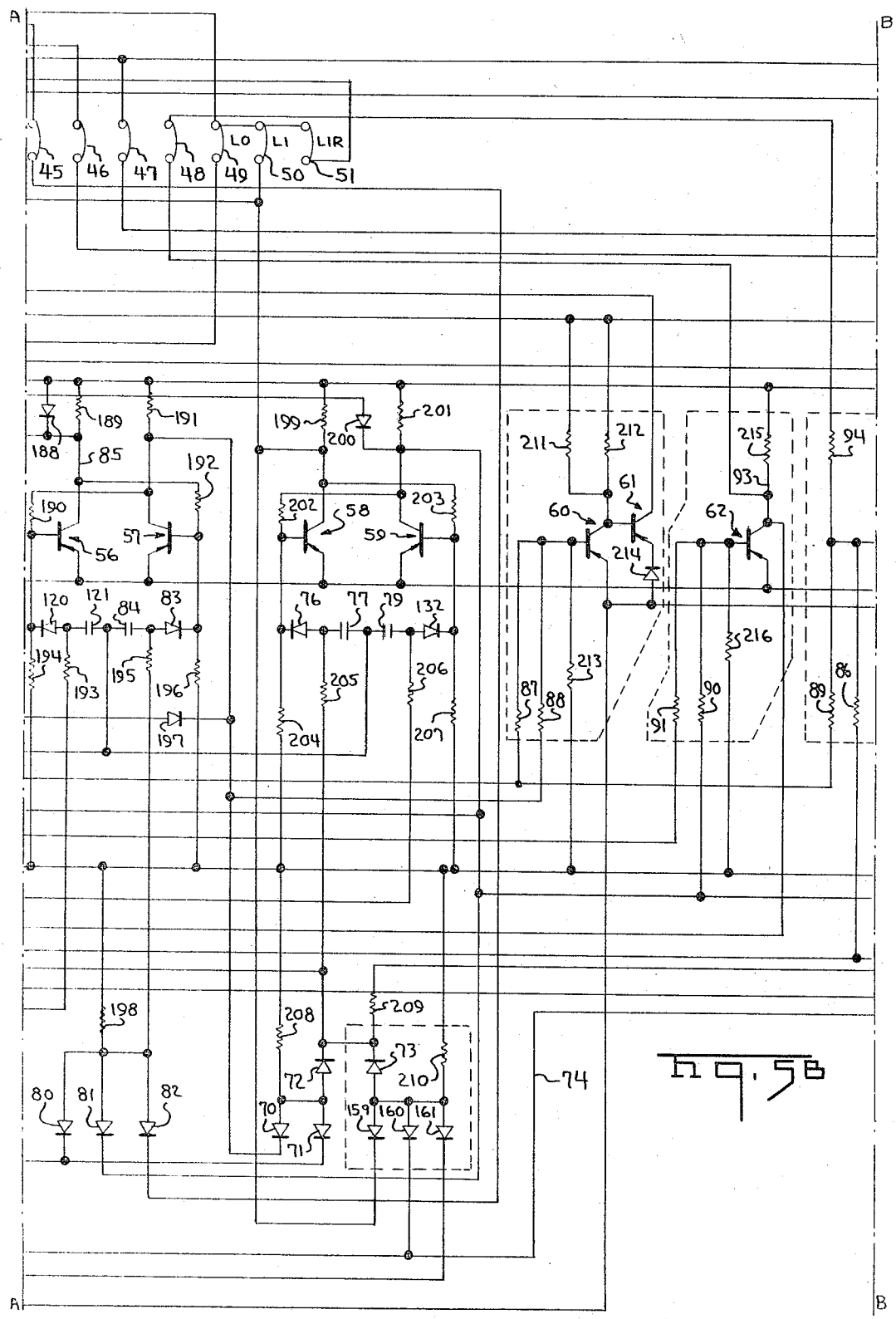
Figure 6C:
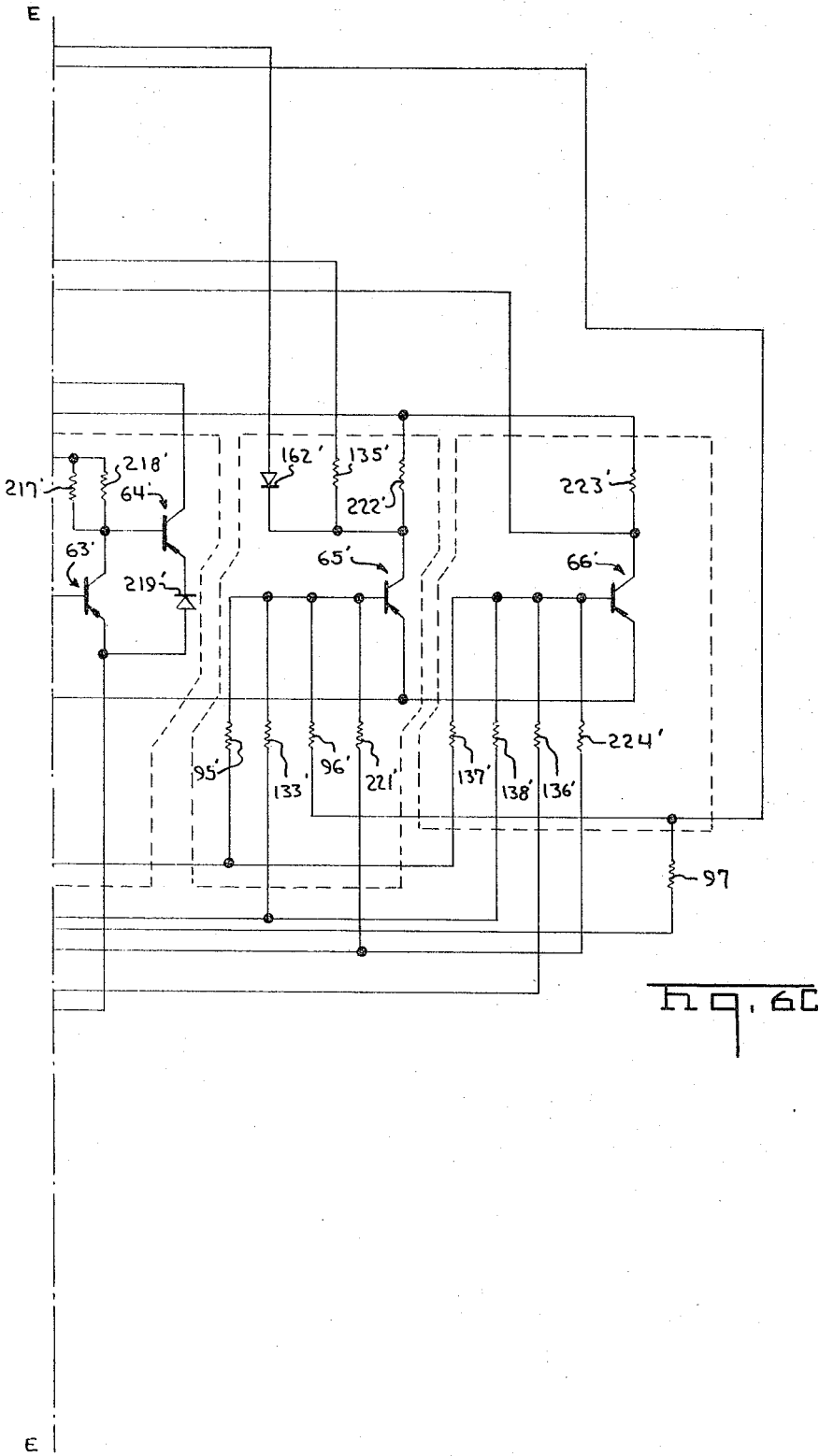

FIGURE 4, composed of FIGURES 4a and 4b, is a composite schematic drawing of the preferred embodiment of the invention;

FIGURE 5, composed of FIGURES 5a to 5c, is a circuit diagram of the block 30 of FIGURE 4;

FIGURE 6, composed of FIGURES 6a to 6c, is a circuit diagram of the block 31 of FIGURE 4;

FIGURE 7 is a circuit diagram of the clock pulse generator;

FIGURE 8 is a circuit diagram of the flasher circuit;

FIGURE 9 is a circuit diagram of the acknowledge amplifier circuit;

FIGURE 10 is a circuit diagram of the clock failure alarm circuit;

FIGURE 11 is a chart of the condition of the various indicators and circuit components for the various states of the several modes of operation of the annunciator system; and FIGURE 12 is a block diagram of the annunciator system of the present invention.

Referring first to FIGURES 1, 2 and 3, there is set forth a block diagram of a typical annunciator system as well known in the art utilizing, in combination therewith, the "gated clock logic" in accordance with the present invention whereby transient signals are rendered undetected for actuating the annunciator system.

FIGURE 1 discloses a normally open alarm contact switch 1, one side of which is connected to ground or reference potential 2. The second contact is connected to a positive source of potential through a resistor 3, this other contact being connected to a first input terminal 4 of an AND gate 5 and a first input terminal 6 of an AND gate 7. A clock pulse generator 8 provides pulses at a predetermined rate (this rate being 100 cycles per second in the preferred embodiment) to the second input terminal 9 of AND gate 5 and the second input terminal 10 of AND gate 7. The output of AND gate 5 is connected to the input 11 of the acknowledge flip-flop 12, the acknowledge switch 13 being coupled to the acknowledge flip-flop 12 by the input 14. The output of the acknowledge flip-flop 12 is connected to the third input 15 of the AND gate 7 and also to the audible device and visual indicator logic 16. The output of AND gate 7 is connected to the input 17 of the alarm flip-flop 18, the output of the alarm flip-flop being connected to the audible device and visual indicator logic circuitry 16. Also, a flasher 19 is coupled to the audible device and visual indicator logic circuitry 16. The audible device and visual indicator logic circuitry 16 provides the required audible devices by transmitting signals to the audible device 20 and provides the required visual signals by providing the necessary signals to the visual indicator 21.

FIG. 2 sets forth the signal complement at the various points of FIGURE 1 labelled A, B, C, D and E. It can be seen from an inspection of FIGURE 2 that, if a transient signal is provided at the point A, such signal will only pass through the AND gate 5 if a proper clock pulse is obtained at point B from the master clock generator 8. In FIGURE 2 it can be seen that the transient wave does not appear at the same time as the clock pulse and therefor no signal will pass through the AND gate 5. However, if such transient signal were to have appeared at the same time as, for example, the clock pulse 1, it can be seen that an output signal would be obtained at point C and, thereby, operate the acknowledge flip flop to provide a pulse at point D. However, when the next clock pulse is obtained as labelled by 2 in the B line, the AND gate 7 will have an input signal at 10 from the clock generator and input signal at 15 from the acknowledge flip-flop 12. However, there will be no signal on the input 6 since the transient signal has now disappeared. Therefore the AND gate 7 will not be enabled and no signal will be obtained at the output thereof at point E to place the alarm flip-flop 18 in the alarm condition.

Referring now to FIG. 3, it can be seen that if a fault condition is sensed as shown at point A the AND gate 5 will be enabled with the first incoming clock pulse thereto labelled 1 on line B thereby providing an output signal at C. In the same manner as mentioned in the paragraph above, an output signal will be provided from the acknowledge flip-flop at point D to the input 15 of AND gate 7. When the next clock pulse labelled 2 on line B is provided by the clock generator 8 there will also continue to be a positive signal at point A and therefore at the input 6 of the AND gate 7. Accordingly, all of the inputs to AND gate 7 will be properly energized to enable this gate and provide an output signal at E to place the alarm flip-flop in the alarm condition.

It can be seen from the above discussion that an alarm condition will be sensed by the annunciator system only when an alarm signal is present at point A for two consecutive clock pulse periods as indicated on line B of FIG. 3.

FIGURE 4 is a composite schematic diagram showing the alarm circuits as they would be arranged in a preferred actual embodiment, these alarm circuits including the alarm circuit of FIGURES 5a to 5c and labelled 30 in FIGURE 4 and the alarm circuit of FIGURES 6a to 6c labelled 31 in FIGURE 4. FIGURE 4 also includes the alarm audible device circuit 32 the ringback audible device circuit 33 and the sequence gate and audible device buffers 34. Each of the alarm circuits 30 and 31 are interconnected in common by the bus 35 which is an input bus to each of the various circuits utilized to determine which alarm circuit registered the first alarm in a sequence of alarms. The bus 36 is a first of sequence bus similar to bus 35 and is utilized as an output circuit from each of the various alarm circuits for determining which alarm circuit was the first to register a fault out of a sequence of faults. The bus 37 carries signals out of each of the alarm circuits and activates a normal horn indicator 52. The bus 38 is also an output bus from each of the alarm circuits and carries signals thereover to activate the ringback horn 53 during a sequence wherein a ringback is utilized.

The description of the circuit diagram in accordance with the preferred embodiment of the present invention will be described with references to FIGURES 4, 5 and 6, first assuming that the switches 39 and 40 are closed and the switches 41 and 42 are open (FIG. 5) to provide for a normally closed remote alarm contact connected to the input bus 43. The normally closed contact would be positioned at a predetermined remote location and is not shown herein but would be similar to the normally opened contact 1 of FIGURE 1. This contact could be a bimetallic switch, for example.

The circuit is first adjusted to operate in the lockout mode with no ringback. In order to provide for this type of operation, each of the switches 46, 48 and 49 will be closed whereas the switches 44, 45, 47, 50 and 51 will be open in the alarm circuit set forth in FIGURE 5.

Initially, with no fault signal on the input bus 43 the normal horn 52 (FIG. 4b) will be off, the ringback horn 53 (FIG. 4b) will be off since we are not operating in the ringback mode, the normal light 54 will be on and the alarm light 55 will be off. The alarm flip-flop composed of transistors 56 and 57 is in the off state, this being defined by transistor 56 being off and transistor 57 being on or conducting. The acknowledge flip-flop composed of transistors 58 and 59 is set so that transistor 58 is conducting and transistor 59 is off. The normal light will be on, this being caused by having transistor 61 in the conductive state. The alarm light 55 will be off, this being caused by having transistor 64 in the off or non-conducting state. The normal audible device 52 (FIG. 4b) is off, this being caused by having transistor 65 in the nonconducting state.

When an alarm condition occurs at the remote alarm switch associated with the alarm circuit of FIGURE 5, the remote alarm switch is opened (since we are working with normally closed contacts by definition) thereby causing the voltage on the input bus 43 and the junction of resistors 67 and 134 to go from a reference potential (ground potential) to a negative voltage. (In the preferred embodiment with the component values as set forth hereinbelow this negative voltage would be minus 6 volts.) The negative voltage on the input bus 43 causes transistor 68 to conduct and thereby turns off the inverter transistor 69. The acknowledge flip-flop composed of transistors 58 and 59 is placed in the unacknowledged state, this being defined by transistor 59 being on or conducting and transistor 58 being off. The acknowledge flip-flop is placed in the unacknowledged state in the following manner. The diodes 70 and 71 form an AND gate whereas the diodes 72 and 73 form an OR gate. Since transistor 57 of the alarm memory flip-flop is still conducting, and a positive or ground potential is now present on the bus 75 which is connected to the collector of transistor 63, a positive voltage is placed at the cathode of each of the diodes 70 and 71 which form an AND gate and enable this AND gate, thereby enabling the OR gate composed of diodes 72 and 73 to cause a change of voltage from a negative voltage to a positive voltage at the junction of diode 76 and capacitor 77. Placing of the ground potential at the junction of diode 76 and capacitor 77 allows the next clock pulse from the clock pulse generator (FIGURE 7, to be explained hereinbelow) to be transmitted along the bus 78 to the junction of capacitors 77 and 79 to turn off transistor 58 and turn on transistor 59, thereby placing the acknowledge flip-flop in the unacknowledged state.

When transistor 59 is conducting the collector thereof goes to zero volts and enables the AND gate composed of diodes 80, 81, 82. Diode 82 is always in the enabled state unless the incoming alarm signal to FIGURE 5 is a secondary alarm of a sequence group (a prior alarm signal has been transmitted to another alarm circuit) wherein another alarm was the first one provided and therefore diode 82 will always be enabled except in the situation indicated above which will be discussed in more detail hereinbelow. Diode 81 is enabled since the acknowledge flip-flop is in the unacknowledged state and diode 80 is enabled since transistor 68 is still conducting. The junction of diode 83 and capacitor 84 is therefore at zero volts and the next or second clock pulse from the clock pulse generator passes through diode 83 and turns off transistor 57 thereby turning on transistor 56. In this manner the alarm memory flip-flop is in the on condition to indicate an alarm.

The collector 85 of transistor 56 is connected to the base of transistor 63 through resistor 86 thereby turning off transistor 63 and turning on the inverter 64. This turns on the alarm light 55. At the same time, since the transistor 57 is off, transistor 60 is turned on and the inverter 61 is turned off to turn off the normal light 54. The transistor 60 is turned on since the resistors 87 and 88 at the input thereto form an RTL logic circuit. Each of the inputs to the base of transistor 60 will be negative, thereby causing the condition of this transistor and the nonconduction of transistor 61.

Since transistor 59 of the acknowledge flip-flop is conducting the input to transistor 63 through resistor 90 is at zero volts. The input to transistor 62 through resistor 91 is a signal that alternates between zero volts and negative voltage at a predetermined frequency which, for the present disclosure, will be set at one cycle per second. This alternating signal is provided by the flasher circuit set forth in FIGURE 8 along the bus 92. Consequently, transistor 62 is turned on and off at a rate of once per second. The output from the collector 93 of transistor 62 is connected to the base of transistor 63 through the switch 48 and resistor 94. Thus transistor 63 is turned on and off at the flasher rate or once per second thereby causing transistor 64 to turn on and off once per second and cause the alarm light 55 to be in the flashing state.

Transistor 65 has an RTL logic circuit coupled to the base thereof composed of resistors 95, 96 and resistor 97 on FIGURE 5c.

Each of the inputs to the base of transistor 65 is at zero volts at this time and therefore transistor 65 is not conducting. The output of the collector 98 of transistor 65 is applied to the base of transistor 99 (FIG. 4a) by passing through resistor 135 (FIG. 5c) to the bus 37 (FIGS. 5a and 4a). Transistor 99 is therefore on or conducting. The output of transistor 99 is applied to the diode 100 of the OR gate composed of diodes 100 to 109, and then to the base of an emitter follower 110 to thereby turn off the transistor 111. Since transistor 111 is off, the relay winding 112 has no current passing therethrough and thereby places the contacts 113 and 114 in a position to contact the terminals 115 and 116 to complete the circuit to the horn 52 and cause an audible indication to be provided by the horn. The contact 113 and 114 are placed in parallel to provide extra current capability.

If the alarm condition now disappears before an acknowledgement and we are still working in the same mode of operation the following occurs in the circuit. A zero volt level will be placed on the input bus 43, thereby placing such voltage on the transistor 68 to turn this transistor off and thereby turn the inverter 69 on. Bus 74, which connects to the collector of transistor 69 is thus caused to be zero volts. The AND gate composed of diodes 117 and 118 is enabled due to the positive or zero voltage level on the bus 74 and the bus 119 which is connected through the switch 49 to ground.

Since the input to diode 117 on bus 119 is at all times at positive or ground potential in the lock-out mode of operation, the state of the alarm memory flip-flop composed of transistors 56 and 57 is dictated only by the condition of bus 74. Therefore, the junction of diode 120 and capacitor 121 will go to zero volts. The next clock pulse from the clock pulse generator along the bus 78 will pass through the diode 120 and turn off transistor 56, thereby turning on transistor 57 and placing the alarm memory flip-flop into the non-alarm or off condition. The acknowledge flip-flop remains in its unacknowledged state. The output from the collector of transistor 57 provides a zero voltage at the base of transistor 60 through resistor 88 and turns off transistor 60, thereby turning on transistor 61 and turning on the normal light 54. Since transistor 56 was turned off, the input to transistor 63 through resistor 86 causes transistor 63 to turn on and transistor 64 to turn off, thereby turning off the alarm light 55. The output from transistor 56 also provides a negative input at the base of transistor 65 through resistor 95, turning off transistor 65 and thereby providing a zero voltage level on the collector thereof to turn off transistor 99. Since all of the inputs to the OR gate composed of diodes 100 to 109 are now at a negative voltage level there will be a proper output signal provided at the output thereof to turn on transistor 111 and thereby reenergize the relay winding 112, thus repositioning the contacts 113 and 114 so that they contact the contact members 122 and 123 and thereby deenergize the horn 52. This places the circuit back in the same condition as it was at the time of the original normal condition.

If we now assume that we are back in the abnormal condition with the alarm light 55 in the flashing state and the audible device 52 in the on condition, and if the alarm s now acknowledged by pressing the acknowledge push button switch 124 of FIGURE 9 (to be described hereinafter) the circuit will operate in the following manner. Referring now to the acknowledge amplifier circuit in FIGURE 9 and assuming that we are working in the normally opened condition of the acknowledge switch 124, a closing of this switch 124 will charge up the capacitor 125 and, after a time delay determined by the RC value of capacitor 125 and the input resistor 126, the transistor 127 will be turned off and the transistor 128 will be turned on, thereby turning off transistor 129 and turning on transistor 130 to provide a true or zero voltage signal at the output bus 131 (FIGS. 5 and 9). This causes the junction of capacitor 79 and diode 132 to go to zero volts (FIG. 5b) and thereby the next signal on the clock bus 78 from the clock pulse generator will pass through diode 132 and turn off transistor 59. In this manner transistor 58 is turned on and the acknowledge flip-flop is therefore in the on or the acknowledged state.

The collector of transistor 59 therefore goes negative, and provides a negative input to the base of transistor 62 through resistor 90, turning on transistor 62 permanently and removing the effects of the flasher. This causes the alarm light 55 to be on but in the permanent or non-flashing state. Since the output from the collector of transistor 59 is negative, a negative voltage is placed on the base of transistor 65 through resistor 133, turning on transistor 64. This is exactly the same step as explained above in going from the abnormal state prior to acknowledgement back to the normal state and therefore turns off the normal audible device 52. The alarm memory flip-flop will remain in the on condition, that is, transistor 56 will be conducting and transistor 57 will be off until the fault condition is removed. The normal light 54 will remain off and the alarm light 55 will stay on but in a steady condition.

Upon a return to the normal condition after operation of the acknowledgement switch 124 (FIG. 9), the alarm memory flip-flop 56 and 57 returns to its normal state with transistor 57 conducting and transistor 56 off and the acknowledge flip-flop remains in its acknowledged state. The acknowledge flip-flop composed of transistors 58 and 59 remains in the acknowledged state at this time since this flip-flop is only reset when the next alarm signal comes into the system along the input bus 43. The acknowledge flip-flop is returned to the unacknowledged state as explained above in explaining the operation of the circuit when the abnormal condition is sensed.

The above is a complete description of the operation of the preferred embodiment of this invention when working in the lock-out mode with no ringback.

The annunciator circuit will now be placed in the lock-in mode with no ringback. This mode of operation is provided by closing the switches 39, 40, 46, 48 and 50 with the switches 41, 42, 44, 45, 47, 49 and 51 remaining open.

Initially, with no fault signal on the input bus 43 the normal horn 52 (FIG. 4b) will be off, the ringback horn 53 (FIG. 4b) will be off since we are not operating in the ringback mode, the normal light 54 will be on and the alarm light 55 will be off. The alarm flip-flop composed of transistors 56 and 57 is in the off state, this being defined by transistor 56 being off and transistor 57 being on or conducting. The acknowledge flip-flop composed of transistors 58 and 59 is set so that transistor 58 is conducting and transistor 59 is off. The normal light will be on, this being caused by having transistor 61 in the conductive state. The alarm light 55 will be off, this being caused by having transistor 64 in the off or non-conducting state. The normal audible device 52 (FIG. 4b) is off, this being caused by having transistor 65 in the nonconducting state.

When an alarm condition occurs at the remote alarm switch associated with the alarm circuit of FIGURE 5, the remote alarm switch is opened thereby causing the voltage on the input bus 43 and the junction of resistors 67 and 134 to go from a reference potential to a negative voltage. The negative voltage on the input bus 43 causes transistor 68 to conduct and thereby turns off the inverter transistor 69. The acknowledge flip-flop composed of transistors 58 and 59 is placed in the unacknowledged state, this being defined by transistor 59 being on or conducting and transistor 58 being off. The acknowledge flip-flop is placed in the unacknowledged state in the following manner. The diodes 70 and 71 form an AND gate whereas the diodes 72 and 73 form an OR gate. Since transistor 57 of the alarm memory flip-flop is still conducting, and a positive or ground potential is now present on the bus 75 which is connected to the collector of transistor 68, a positive voltage is placed at the cathode of each of the diodes 70 and 71 which form an AND gate and enable this AND gate, thereby enabling the OR gate composed of diodes 72 and 73 to cause a change of voltage from a negative voltage to a positive voltage at the junction of diode 76 and capacitor 77. Placing of the ground potential at the junction of diode 76 and capacitor 77 allows the next clock pulse from the clock pulse generator (FIGURE 7) to be transmitted along the bus 78 to the junction of capacitors 77 and 79 to turn off transistor 58 and turn on transistor 59, thereby placing the acknowledge flip-flop in the unacknowledged state.

When transistor 59 is conducting the collector thereof goes to zero volts and enables the AND gate composed of diodes 80, 81, 82. Diode 82 is always in the enabled state unless the incoming alarm signal to FIGURE 5 is a secondary alarm of a sequence group wherein another alarm was the first one provided and therefore diode 82 will always be enabled except in the situation indicated above which will be discussed in more detail hereinbelow. Diode 81 is enabled since the acknowledge flip-flop is in the unacknowledged state and diode 80 is enabled since transistor 68 is still conducting. The junction of diode 83 and capacitor 84 is therefore at zero volts and the next or second clock pulse from the clock pulse generator passes through diode 83 and turns off transistor 57 thereby turning on transistor 56. In this manner the alarm memory flip-flop is in the on condition to indicate an alarm.

The collector 85 of transistor 56 is connected to the base of transistor 63 through resistor 86 thereby turning off transistor 63 and turning on the inverter 64. This turns on the alarm light 55. At the same time, since the transistor 57 is off, transistor 60 is turned on and the inverter 61 is turned off to turn off the normal light 54. The transistor 60 is turned on since the resistors 87 and 88 at the input thereto form an RTL logic circuit. Each of the inputs to the base of transistor 60 will be negative, thereby causing the condition of this transistor and the nonconduction of transistor 61.

Since transistor 59 of the acknoweldge flip-flop is conducting the input to transistor 63 through resistor 90 is at zero volts. The input to transistor 63 through resistor 91 is a signal that alternates between zero volts and negative voltage at a predetermined frequency which, for the present disclosure will be set at one cycle per second. This alternating signal is provided by the flasher circuit set forth in FIGURE 8 along the bus 92. Consequently, transistor 62 is turned on and off at a rate of once per second. The output from the collector 93 of transistor 62 is connected to the base of transistor 63 through the switch 48 and resistor 94. Thus transistor 63 is turned on and off at the flasher rate or once per second thereby causing transistor 64 to turn on and off once per second and cause the alarm light 55 to be in the flashing state.

Transistor 65 has an RTL logic circuit coupled to the base thereof composed of resistors 95, 96 and resistor 97 on FIGURE 5c.

Each of the inputs to the base of transistor 65 is at zero volts at this time and therefore transistor 65 is not conducting. The output of the collector 98 of transistor 65 is applied to the base of transistor 99 (FIG. 4a) by passing through resistor 135 (FIG. 5c) to the bus 37 (FIG. 5a and 4a). Transistor 99 is therefore on or conducting. The output of transistor 99 is applied to the diode 100 of the OR gate composed of diodes 100 to 109, and then to the base of an emitter follower 110 to turn off the transistor 111. Since transistor 11 is off, the relay winding 112 has no current passing therethrough and thereby places the contacts 113 and 114 in a position to contact the terminals 115 and 116 to complete the circuit to the horn 52 and cause an audible indication to be provided by the horn. The contact 113 and 114 are placed in parallel to provide extra current capability.

In the lock-in mode of operation there is now a difference as compared with the lock-out mode when an alarm signal is provided but not acknowledged and then the alarm signal disappears prior to acknowledgement. This difference in circuit operation is performed in the following manner.

When the alarm or fault disappears, the normally closed remote alarm sensor is again closed and provides ground or positive potential on the bus 43 (FIG. 5a). The cathode of the diode 117 of the AND gate composed of diodes 117 and 118 is connected to the collector of transistor 58 through the lock-in mode switch 50 rather than being connected directly to ground through the lock-out mode switch 49 as in the previously discussed lock-out operation. Since the acknowledge flip-flop is in the unacknowledged state with transistor 58 being off and transistor 59 being on or conducting, the input to diode 117 from the collector of transistor 58 is negative and thereby inhibits the AND gate composed of diodes 117 and 118. Therefore, if the alarm signal on bus 74 returns to normal, the junction of diode 120 and capacitor 121 remains negative and all clock pulses from the clock pulse generator generated along the clock bus 78 will not pass through the diode 120 and will not reset the alarm memory flip-flop composed of transistors 56 and 57, thereby allowing transistor 56 to continue to conduct.

It can be seen that the alarm memory flip-flop, once placed in the alarm condition will therefore remain in this condition under the lock-in mode of operation. The alarm flip-flop can only be returned to its normal state by operation of the acknowledge switch 124 (FIG. 9).

If we now assume that we are back in the abnormal condition with the alarm light 55 in the flashing state and the audible device 52 in the on condition, and if the alarm is now acknowledged by pressing the acknowledge push button switch 124 of FIGURE 9 the circuit will operate in the following manner. Referring now to the acknowledge amplifier circuit in FIGURE 9 and assuming that we are working in the normally opened condition of the acknowledge switch 124, a closing of this switch 124 will charge up the capacitor 125 and, after a time delay determined by the RC value of capacitor 125 and the input resistor 126, the transistor 127 will be turned off and the transistor 128 will be turned on, thereby turning off transistor 129 and turning on transistor 130 to provide a true or zero voltage signal at the output bus 131 (FIGS. 5 and 9). This causes the junction of capacitor 79 and diode 132 to go to zero volts (FIG. 5b) and thereby the next signal on the clock bus 78 from the clock pulse generator will pass through diode 132 and turn off transistor 59. In this manner transistor 58 is turned on and the acknowledge flip-flop is therefore in the on or the acknowledged state.

The collector of transistor 59 therefore goes negative, and provides a negative input to the base of transistor 62 through resistor 90, turning on transistor 62 permanently and removing the effects of the flasher. This causes the alarm light 55 to be on but in the permanent or non-flashing state. Since the output from the collector of transistor 59 is negative, a negative voltage is placed on the base of transistor 65 through resistor 133, turning on transistor 64. This is exactly the same step as explained above in going from the abnormal state prior to acknowledgement back to the normal state and therefore turns off the normal audible device 52. The alarm memory flip-flop will remain in the on condition, that is, transistor 56 will be conducting and transistor 57 will be off until the fault condition is removed. The normal light 54 will remain off and the alarm light 55 will stay on but in a steady condition.

In order to reset the annunciator system under the circumstance where an abnormal condition has been sensed in the lock-in mode and the abnormal condition has disappeared before an acknowledgement, it is necessary to depress the acknowledge switch 124. In this sequence of operation exactly the same procedure will arise as in the case where the fault or abnormal condition remains but disappears immediately after an acknowledge condition as described in the section immediately hereinabove.

Upon a return to the normal condition after operation of the acknowledgement switch 124 (FIG. 9), the alarm memory flip-flop 56 and 57 returns to its normal state with transistor 57 conducting and transistor 56 off and the acknowledge flip-flop remains in its acknowledged state. The acknowledge flip-flop composed of transistors 58 and 59 remains in the acknowledged state at this time since this flip-flop is only reset when the next alarm signal comes into the system along the input bus 43. The acknowledge flip-flop is returned to the unacknowledged state as explained above in explaining the operation of the circuit when the abnormal condition is sensed.

The third possible sequence of operation is the lock-in mode with ringback. This is achieved by closing switches 39, 40, 46, 47, 48 and 51 and opening switches 41, 42, 44, 45, 49 and 50. It should be understood that the ringback horn 53 (FIG. 4b) will have an audible sound which is noticeably different from that of horn 52.

When operating in the mode of operation using lock-in and ringback, when no abnormal condition is sensed on the bus 43 the system will operate as follows.

Initially, with no fault signal on the input bus 43 the normal horn 52 (FIG. 4b) will be off, the ringback horn 52 (FIG. 4b) will be off, the ringback horn 53 (FIG. 4b) will be off but we are now operating in the ringback mode, the normal light 54 will be on and the alarm light 55 will be off. The alarm flip-flop composed of transistors 56 and 57 is in the off state, this being defined by transistor 56 being off and transistor 57 being on or conducting. The acknowledge flip-flop composed of transistors 58 and 59 is set so that transistor 58 is conducting and transistor 59 is off. The normal night will be on, this being caused by having transistor 61 in the conductive state. The alarm light 55 will be off, this being caused by having transistor 64 in the off or non-conducting state. The normal audible device 52 (FIG. 4b) is off, this being caused by having transistor 65 in the nonconducting state.

When an alarm condition occurs at the remote alarm switch associated with the alarm circuit of FIGURE 5, the remote alarm switch is opened thereby causing the voltage on the input bus 43 and the junction of resistors 67 and 134 to go from a reference potential to a negative voltage. The negative voltage on the input bus 43 causes transistor 68 to conduct and thereby turns off the inverter transistor 69. The acknowledge flip-flop composed of transistors 58 and 59 is placed in the unacknowledged state, this being defined by transistor 59 being on or conducting and transistor 58 being off. The acknowledge flip-flop is placed in the unacknowledged state in the following manner. The diodes 70 and 71 form an AND gate whereas the diodes 72 and 73 form an OR gate. Since transistor 57 of the alarm memory flip-flop is still conducting, and a positive or ground potential is now present on the bus 75 which is connected to the collector of transistor 68, a positive voltage is placed at the cathode of each of the diodes 70 and 71 which form an AND gate and enable this AND gate, thereby enabling the OR gate composed of diodes 72 and 73 to cause a change of voltage from a negative voltage to a positive voltage at the junction of diode 76 and capacitor 77. Placing of the ground potential at the junction of diode 76 and capacitor 77 allows the next clock pulse from the clock pulse generator (FIGURE 7) to be transmitted along the bus 78 to the junction of capacitors 77 and 79 to turn off transistor 58 and turn on transistor 59, thereby placing the acknowledge flip-flop in the unacknowledged state.

When transistor 59 is conducting the collector thereof goes to zero volts and enables the AND gate composed of diodes 80, 81, 82. Diode 82 is also in the enabled state unless the incoming alarm signal to FIGURE 5 is a secondary alarm of a sequence group wherein another alarm was the first one provided and therefore diode 82 will always be enabled except in the situation indicated above which will be discussed in more detail hereinbelow. Diode 81 is enabled since the acknowledge flip-flop is in the unacknowledged state and diode 80 is enabled since transistor 68 is still conducting. The junction of diode 83 and capacitor 84 is therefore at zero volts and the next or second clock pulse from the clock pulse generator passes through diode 83 and turns off transistor 57 thereby turning on transistor 56. In this manner the alarm memory flip-flop is in the on condition to indicate an alarm.

The collector 85 of transistor 56 is connected to the base of transistor 63 through resistor 86 thereby turning off transistor 63 and turning on the inverter 64. This turns on the alarm light 55. At the same time, since the transistor 57 is off, transistor 60 is turned on and the inverter 61 is turned off to turn off the normal light 54. The transistor 60 is turned on since the resistors 87 and 88 at the input thereto form an RTL logic circuit. Each of the inputs to the base of transistor 60 will be negative, thereby causing the conduction of this transistor and the nonconduction of transistor 61.

Since transistor 59 of the acknowledge flip-flop is conducting the input to transistor 63 through resistor 90 is at zero volts. The input to transistor 63 through resistor 91 is a signal that alternates between zero volts and negative voltage at a predetermined frequency which, for the present disclosure, will be set at one cycle per second. This alternating signal is provided by the flasher circuit set forth in FIGURE 8 along the bus 92. Consequently, transistor 62 is turned on and off at a rate of once per second. The output from the collector 93 of transistor 62 is connected to the base of transistor 63 through the switch 48 and resistor 94. This transistor 63 is turned on and off at the flasher rate or once per second thereby causing transistor 64 to turn on and off once per second and cause the alarm light 55 to be in the flashing state.

Transistor 65 has an RTL logic circuit coupled to the based thereof composed of resistors 95, 96 and resistor 97 on FIGURE 5c.

Each of the inputs to the base of transistor 65 is at zero volts at this time and therefore transistor 65 is not conducting. The output of the collector 98 of transistor 65 is applied to the base of transistor 99 (FIG. 4a) by passing through resistor 135 (FIG. 5c) to the bus 37 (FIG. 5a and 4a). Transistor 99 is therefore on or conducting. The output of transistor 99 is applied to the diode 100 of the OR gate composed of diodes 100 to 109, and then to the base of an emitter follower 110 to turn off the transistor 111. Since transistor 111 is off, the relay winding 112 has no current passing therethrough and thereby places the contacts 113 and 114 in a position to contact the terminals 115 and 116 to complete the circuit to the horn 52 and cause an audible indication to be provided by the horn. The contact 113 and 114 are placed in parallel to provide extra current capability. The ringback is not energized until the acknowledge flip-flop is in the acknowledged state.

If the system returns to normal after an abnormal condition has been received by the annunciator system and before acknowledgement of the abnormal condition, the system will operate in the following manner.

The voltage on the bus 43 returns to normal when the alarm or abnormal condition is no longer present. Since a positive or ground condition now exists on bus 43, the transistor 68 is turned off and transistor 69 is turned on. The output from the collector of transistor 69 is connected through the normally closed switch 40 and the resistor 136 to the base of transistor 66. Since transistor 56 is on, the collector thereof goes to a positive (zero) voltage and applies this voltage to the base of transistor 66 through resistor 137. Also transistor 59 is on, thereby providing a positive voltage at the collector thereof, this collector being coupled to the base of transistor 66 through resistor 138. The resistors 136, 137 and 138 form an RTL logic circuit with transistor 66. The voltage level at the input of each of these resistors 136, 137 and 139 is at zero volts to indicate a true condition causing transistor 66 to be cut off and energize the ringback horn 53 by causing the collector of transistor 66 to be at a negative voltage level. This negative voltage level is transmitted through switch 47 from the collector of transistor 66 to the base of transistor 65 through the resistor 96 and turns on transistor 65 to provide a positive or ground voltage level on the collector thereof. This turns off the normal audible device 52.

As explained hereinabove, the negative output from the collector of transistor 66 is also connected through resistor 139 and switch 47 to the base of transistor 140 (FIG. 4a). Transistor 140 is turned on and the collector of transistor 140 goes to zero volts. This positive or zero voltage is applied to the base of transistor 141 through diode 142 which is one input of an OR circuit composed of diodes 142 to 151. Transistor 141 is thus turned off, thereby turning on transistor 153 through emitter follower 152. When transistor 153 is conducting the relay winding 154 is energized and places the contacts 155 and 156 in contact with the contacts 157 and 158, thereby maintaining the circuit to the ringback horn 53 closed and energizing the horn 53.

Since the system is now back in the normal condition each of the inputs to the base of transistor 66 will be at a positive or ground voltage level except the input from the collector of transistor 59 which is negative. Transistor 66 will be turned on and the ringback horn 53 (FIG. 4b) will be turned off.

When the abnormal condition still exists and the acknowledge switch 124 (FIG. 9) is operated, the circuit will operate as follows.

If we now assume that we are back in the normal condition with the alarm light 55 in the flashing state and the audible device 52 in the on condition, and if the alarm is now acknowledged by pressing the acknowledge push button switch 124 of FIGURE 9 the circuit will operate in the following manner. Referring now to the acknowledge amplifier circuit in FIGURE 9 and assuming that we are working in the normally opened condition of the acknowledge switch 124, a closing of this switch 124 will charge up the capacitor 125 and, after a time delay determined by the RC value of capacitor 125 and the input resistor 126, the transistor 127 will be turned off and the transistor 128 will be turned on, thereby turning off transistor 129 and turning on transistor 130 to provide a true or zero voltage signal at the output bus 131 (FIGS. 5 and 9). This causes the junction of capacitor 79 and diode 132 to go to zero volts (FIG. 5b) and thereby the next signal on the clock bus 78 from the clock pulse generator will pass through diode 132 and turn off transistor 59. In this manner transistor 58 is turned on and the acknowledge flip-flop is therefore in the on or the acknowledged state.

The collector of transistor 59 therefore goes negative, and provides a negative input to the base of transistor 62 through resistor 90, turning on transistor 62 permanently and removing the effects of the flasher. This causes the alarm light 55 to be on but in the permanent or non-flashing state. Since the output from the collector of transistor 59 is negative, a negative voltage is placed on the base of transistor 65 through resistor 133, turning on transistor 64. This is exactly the same step as explained above in going from the abnormal state prior to acknowledgement back to the normal state and therefore turns off the normal audible device 52. The alarm memory flip-flop will remain in the on condition, that is, transistor 56 will be conducting and transistor 57 will be off until the fault condition is removed. The normal light 54 will remain off and the alarm light 55 will stay on but in a steady condition.

The ringback signal 53 (FIG. 4b) will be turned off in the manner described above since the input voltage on the bus 43 is negative, thereby causing the voltage on the bus 74 which is the input to the base of transistor 66 through the resistor 136 to go negative. This causes transistor 66 to conduct and turns off the audible ringback signal 53.

In the event that the system returns to normal and there is acknowledgement the system operates as follows.

In order to reset the annunciator system under the circumstance where an abnormal condition has been sensed in the lock-in mode and the abnormal condition has disappeared before an acknowledgement, it is necessary to depress the acknowledge switch 124. In this sequence of operation exactly the same procedure will arise as in the case where the fault or abnormal condition remains but disappears immediately after an acknowledge condition as described in the section immediately hereinabove.

When the input returns to normal after an acknowledged condition has been sensed with the system still in the abnormal condition, transistor 68 is turned off due to the zero voltage level at the base thereof and transistor 69 is thereby turned on. The acknowledge flip-flop (transistors 58 and 59) is triggered to unacknowledged state whereby transistor 59 is on and transistor 58 is off by virture of the operation of the diode AND gate composed of diodes 159, 160 and 161 which gate operates in the following manner. When the input bus 43 returns to the normal or ground voltage condition the acknowledge flip-flop is still in the acknowledged state and therefore the input to diode 159 is zero volts. The output from the collector of transistor 56 is still at zero volts and this zero voltage level is applied to the cathode of diode 161. Since the input to diode 160 is now also positive due to the positive voltage on bus 74, this AND gate composed of diodes 159, 160 and 161 is enabled and the junction of diode 76 and capacitor 77 is placed at zero volts. Thereby the next clock pulse at the junction of capacitors 77 and 79, which appears on the clock pulse bus 78, passes through diode 76 and turns off transistor 58 to place the acknowledge flip-flop in the unacknowledged state.

The output from the collector of transistor 59 is now at zero volts and thereby places a zero voltage input at the base of transistor 62 through resistor 90. This voltage will have a tendency to turn off transistor 62, however, the other input to the base of transistor 62 through resistor 91 provides a negative alternating input of one cycle per second and thereby provides a flashing or periodic output from the collector of transistor 62. This periodic output from the collector of transistor 62 causes the alarm light 55 to be in a flashing state as described hereinabove. The ringback audible device is again turned on in exactly the same manner as described hereinabove when the system returns to normal after an abnormal condition and before acknowledgement.

In order to return the entire system to the normal condition in the sequence of operation with lock-in and ringback, the following conditions exist. The acknowledge switch 124 on FIG. 9 is operated for a second time, placing the input 131 on FIG. 5a at ground potential. This input is applied through the switch 51 to diode 117 of the AND gate composed of diodes 117 and 118 and places the junction of diode 120 and capacitor 121 at zero volts. When the junction of diode 120 and capacitor 121 is at zero volts, the next clock pulse at the junction of capacitors 121 and 84, applied along the clock bus 78, is allowed to pass through the diode 120 and turn off transistor 56, thereby turning on transistor 57. This is the normal condition for the alarm memory flip-flop. The output from the collector of transistor 56 is applied through the resistor 137 to the base of transistor 66 to turn this transistor on and thereby turn off the ringback audible device 53. The alarm light 55 is turned off since the input to the base of transistors 63 through resistor 86 goes negative, thereby turning on transistor 63 and turning off transistor 64. This condition causes the alarm light 55 to be turned off. The normal light 54 is turned on since the inputs supplied through resistors 87 and 88 to the base of transistor 60 are at zero volts at this time and thereby turn off transistor 60 which in turn causes transistor 61 to conduct thereby turning on the light 54.

This ends the sequence of operation of the annunciator system.

As mentioned hereinabove, the FIGURES 5 and 6 are positioned electrically as set forth in FIGURE 4. The circuitry of FIGURES 5 and 6 works together thereby eliminating the requirement to include circuitry such as the acknowledge flip-flop etc., as will be evident from inspection of the figures. FIGURES 5 and 6 are coupled together via the buses 131, 492, 35, 36, 493, 78, 494, 495, 500, 498, 497, 37 and 38.

The buses 43 and 43' are coupled to separate normally closed alarm sensors to be able to sense, for example, when an equipment temperature is above or below a predetermined range or any other set of two conditions. The particular sensor actuated is determined by the lights 55 and 55', there being one light for each alarm circuit.

Referring now to FIG. 4, and particularly to the diode gating circuits including diodes 101 to 109 and 256 to 264, these diodes are utilized for connection to other identical groups of circuits as shown in FIGURE 4, all such circuits operating with the same horns 52 and 53. The terminal 499 in FIG. 4a is coupled to all other circuits, if any, in the system identical to that of FIG. 4 to provide an indication as to which alarm was the first of a sequence as will be explained in detail hereinbelow.

Referring again to the bus 131 which is shown in FIGURES 5a, 6a and 9, this bus transmits the acknowledge signal provided when the acknowledge switch 124 (FIG. 9) has been closed. This bus 131 is common to each and every circuit 30 and 31 of FIGURE 4 and any additional circuits identical to FIGURE 4 which are utilized and connected into the circuit of FIGURE 4 via terminal 499 and diodes 101 to 109 and 256 to 264.

As set forth hereinabove, the present annunciator system is operable either with a normally open alarm sensor or a normally closed alarm sensor coupled to bus 43, 43' etc. This system has been explained assuming normally closed contacts, however, the system would be operable with normally open contacts merely by closing the switches 41 and 42 and opening the switches 39 and 40. Since the transistor 68 and 69 are dual inverters, the collector of transistor 68 will be positive when the collector of transistor 69 is negative and vice versa. It can be seen that the collector of transistor 69 is coupled to bus 74 and diode 118 when switch 40 is closed and switch 41 is open and that the collector of transistor 68 is coupled to diode 118 and bus 74 when switch 41 is closed and switch 40 is open. Accordingly, the proper manipulation of switches 39 to 43 will enable the alarm circuit to operate with either normally open or normally closed switches. It is also clear that each separate alarm circuit can operate with either normally open or normally closed switches independently of the other alarm circuits in the annunciator system.

Referring to FIGURES 5 and 6 and as mentioned hereinabove, the annunciator system is capable of operating with each alarm circuit set for a different mode of operation as set forth in the table of FIGURE 11 merely by setting the switches 47, 49, 50 and 51 for the desired mode of operation uniquely in each alarm circuit. The alarm circuits are perfectly compatible for such operation.

The annunciator system also includes circuitry whereby it can be determined from whence the first alarm signal of a group of interlocked devices came. This is accomplished as follows: Switches 43 and 44 are closed on all alarm circuits common to an interlocked group of devices. Under normal conditions, the input to diode 82 of each module is maintained at zero volts as described previously. Under normal conditions transistor 65 is on and the collector thereof is at zero volts. This zero voltage level is applied to bus 36 on FIG. 6a, this zero voltage level passing through diode 162A which is one of a plurality of diodes 162, one for each card. These diodes form an AND gate connected to transistor 163 in FIGURE 4a through resistor 164. This signal goes through the slide switch 44 and causes transistor 163 to be off, turning on transistor 165. The output of transistor 165 is fed back through a diode 166 to the bus 35 which is the input to diode 82 as previously mentioned. When an alarm condition occurs, as explained above, the collector of transistor 65 goes negative, applying a negative input to the base of transistor 163 through diode 162. This turns on transistor 163 and turns off transistor 165. Diodes 166 and 168 (FIG. 42) form an OR gate to the bus 167. Under normal conditions the bus 131 is negative. When the collector of transistor 165 goes negative the bus 167 goes negative by virtue of the pull down resistor 169 to minus 12 volts. This negative signal is applied through diode 82 through the junction of capacitor 84 and diode 83, inhibiting clock pulses from bus 78 from going through diode 83 and effecting transistor 57. Therefore, even if an alarm condition occurs, making the input through diodes 80 and 81 true or positive as explained above, the actual alarm itself will not be recorded. When the acknowledge button 124 is pushed, the signal on bus 131 is made positive as explained above, causing bus 167 of FIG. 4a to go positive. Thus the input to diode 82 of all subsequent alarm circuits is made true or zero, enabling the AND gates composed of diodes 80, 81 and 82 of each of these alarm circuits to be enabled and thereby enable the corresponding alarm memory flip-flops to be turned on as explained supra.

The following is a discussion of the operation of the flasher circuit as set forth in FIGURE 8.

The flasher is composed of a free running multivibrator composed of transistors 170 and 171, the frequency of the flipping action being determined by the value of the capacitor and the base resistors 173 and 174 of transistor 171. This is normally set for one cycle per second. The output from the collector of transistor 171 is applied to the base of transistor 175 to provide amplification, the output from the collector thereof being applied to the base of transistor 176 to provide power amplification of the signal. The output from the collector of transistor 176 is the previously mentioned flasher output 92.

The following is a discussion of the clock pulse generator of FIGURE 7 utilized to provide the signals at the bus 78 of the basic alarm circuit.

Transistors 176 and 177 together form a free running multivibrator circuit having a frequency determined by the value of the capacitors and the base resistors thereof. The output from the collector of transistor 177 is determined by the value of the capacitors and resistors mentioned above and in this embodiment is pre-set at one hundred cycles per second. The output from the collector of transistor 177 goes to the base of transistor 178 which is part of a one shot composed of transistors 178 and 179 to provide a sharp positive going pulse at the collector of transistor 179, this being the output 78.

The systems also provides for clock failure alarm as set forth in FIGURE 10 in the event that the clock circuit should break down, an alarm will be provided.

In all of the prior discussion, voltages such as, zero, positive, negative, ground and minus 6 volts have been mentioned. It should be understood that all of the voltages are relative, there being a reference or ground voltage which is also set forth as being a positive voltage or zero voltage and a negative or minus six voltage.

FIGURE 12 is a block diagram of the annunciator system described in detail hereinbelow where character references correspond to the character references previously used and depict the same structures. The key below FIGURE 12 provides the legend for the various gate circuits.

Though the invention has been described with reference to a specific embodiment of the invention, many alterations and modifications thereof will immediately become obvious to those skilled in the art. It is therefore the intention that the claims appended hereto be interpreted as broadly as possible in view of the prior art to encompass all such alterations and modifications.

We claim:

1. In an annunciator system having an abnormal condition sensor input, a clock pulse generator and alarm indication means, means for preventing operation of said alarm system responsive to a transient signal, said means including first means responsive to a simultaneous clock pulse from said clock pulse generator and an abnormal condition indication at said abnormal condition sensor input to provide a first fault indication, second means responsive to the simultaneous application thereto of each of (1) the next succeeding clock pulse from said clock pulse generator, (2) an abnormal indication at said abnormal condition sensor input and (3) said first fault indication to provide a second fault indication and means responsive to said second fault indication to operate said alarm indication means.

2. An annunciator system as set forth in claim 1 wherein said first means is an AND gate.

3. An annunciator system as set forth in claim 1 wherein said second means is an AND gate.

4. An annunciator system as set forth in claim 2 wherein said second means is an AND gate.

5. An annunciator system as set forth in claim 1, further a bistable device having a normally on and a normally off element responsive to said second fault indication for altering the state of said bistable device.

6. An annunciator system as set forth in claim 4, further a bistable device having a normally on and a normally off element responsive to said second fault indication for altering the state of said bistable device.

References Cited by the Examiner

UNITED STATES PATENTS

| | | | |
|---|---|---|---|
| 2,982,943 | 5/1961 | Isaacson et al. | 340—248.8 X |
| 3,099,826 | 7/1963 | Noreen et al. | 340—213.2 |
| 3,110,866 | 11/1963 | Maure et al. | 328—110 |
| 3,150,294 | 9/1964 | Dastidar | 340—213 X |
| 3,155,950 | 11/1964 | Foster | 340—213.2 |
| 3,170,075 | 2/1965 | Mellott. | |
| 3,193,814 | 7/1965 | Foster | 340—223 |
| 3,202,976 | 8/1965 | Rowell | 340—213 |
| 3,218,621 | 11/1965 | Foster | 340—213.2 |

FOREIGN PATENTS 1,238,411   7/1960   France.

NEIL C. READ, *Primary Examiner.*

R. M. ANGUS, D. YUSKO, *Assistant Examiner.*